March 6, 1973 — J. MAURICE — 3,719,257
DISC-BRAKE AND SUPPORT STRUCTURE
Filed May 8, 1970 — 11 Sheets-Sheet 1

FIG. 1

INVENTOR
JEAN MAURICE
By Young & Thompson
Attys.

United States Patent Office 3,719,257
Patented Mar. 6, 1973

3,719,257
DISC-BRAKE AND SUPPORT STRUCTURE
Jean Maurice, Paris, France, assignor to Societe Anonyme Francaise du Ferodo, Paris, France
Filed May 8, 1970, Ser. No. 35,643
Claims priority, application France, May 4, 1969, 6915621; May 11, 1969, 6919288; July 11, 1969, 6923672
The portion of the term of the patent subsequent to Feb. 3, 1987, has been disclaimed
Int. Cl. F16d 55/228
U.S. Cl. 188—73.4                                    21 Claims

ABSTRACT OF THE DISCLOSURE

A disc-brake of the kind comprising a rotating disc rigidly fixed to the member to be braked, a fixed support, to brake-shoes mounted so as to move perpendicularly to the plane of the disc on each side of said disc, an actuating unit and a transfer member, said actuating unit acting directly on one of said brakeshoes and indirectly on the other through the intermediary of said transfer member, in which said transfer member bears solely on three supporting areas which are flat, two of said areas being incorporated in said fixed support on the same side of the disc, while the third area is disposed on the other side of said disc, thus providing improved means for retaining said transfer member in position.

---

The present invention relates to disc brakes of the kind comprising a disc rigidly fixed to the member to be braked, a fixed support, two brake-shoes movably mounted perpendicular to the plane of the disc and on each side of this latter, an actuation unit and a transfer member, the said actuation unit acting directly on one of the brake-shoes and indirectly on the other through the intermediary of the transfer member.

It is more particularly but not exclusively directed to those disc-brakes of this kind in which the brake-shoes are arranged in housings formed in the fixed support on each side of the disc, the actuating unit is mounted in a movable manner on the said support, and the transfer member is an annular piece surrounding the actuating unit and the brake-shoes.

The present invention has for its object to improve the maintenance of the transfer member.

According to the invention, the transfer member is only in contact with three supporting areas which are flat, of which two are arranged on the fixed support on the same side of the disc and in which the third is arranged on the other side of the disc.

This arrangement gives the transfer member a better defined seating than if, in the usual manner, it rested on four or a greater number of supporting areas or than if it rested on supporting surfaces of which some have an indefinite real supporting surface.

In addition, by virtue of this arrangement, these supporting areas to which it is possible to give relatively small dimensions, will all be easily, rapidly and simultaneously run-in from the beginning of the putting into service of the brake, which ensures for the transfer member a perfect bearing surface of adequate area and having the minimum friction.

According to a preferred form of construction, the third supporting area of the transfer member is formed on the brake-shoe located on the side of the disc which is opposite to the actuating unit, that is to say on the brake-shoe with which the said transfer member co-operates.

Thus, one of the supporting areas of the transfer member follows the latter in its movements, which correspondingly reduces the friction.

In addition, the transfer member, which is itself acted upon by elastic means, ensures by itself a radial retention in one direction of the brake-shoe concerned, which is furthermore supported in the other direction against the bottom of its housing, without it being necessary to provide for this radial retention special elastic means proper to this shoe. This results in a not-negligible economy in construction and a simplification of the mounting.

According to an advantageous form of construction, the transfer member is provided on at least part of its surface with parallel corrugations having generator lines perpendicular to the plane of the disc.

This arrangement offers the particular advantage of stiffening the transfer member in a direction perpendicular to the disc, namely in the direction of the force which it is required to transmit. All other conditions being equal, this stiffening effect makes it possible to choose, for the construction of the transfer member, a metal sheet of smaller thickness which is thus easier to press.

According to a particular form of construction, this arrangement has the further advantage of facilitating the support of the transfer member on the fixed support, this support being preferably effected by contact of the hollow parts of the corrugations of the transfer member with projections formed on the fixed support along the lateral edges of this latter.

The characteristic features and advantages of the invention will furthermore be brought out in the description which follows below, given by way of example, reference being made to the accompanying diagrammatic drawings, in which.

Figure 1:
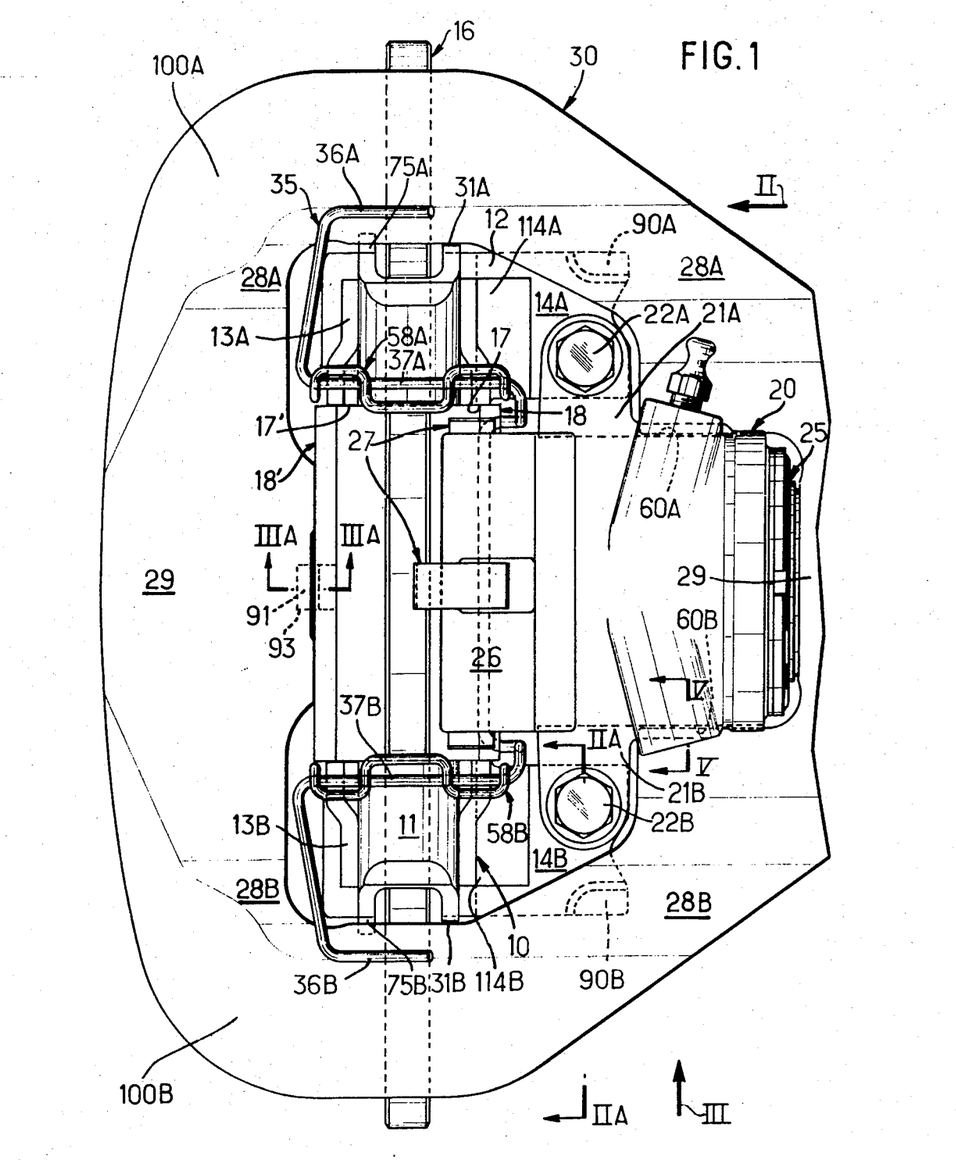
FIG. 1 is a partial view in plan of a disc-brake according to the invention.
Figure 2:
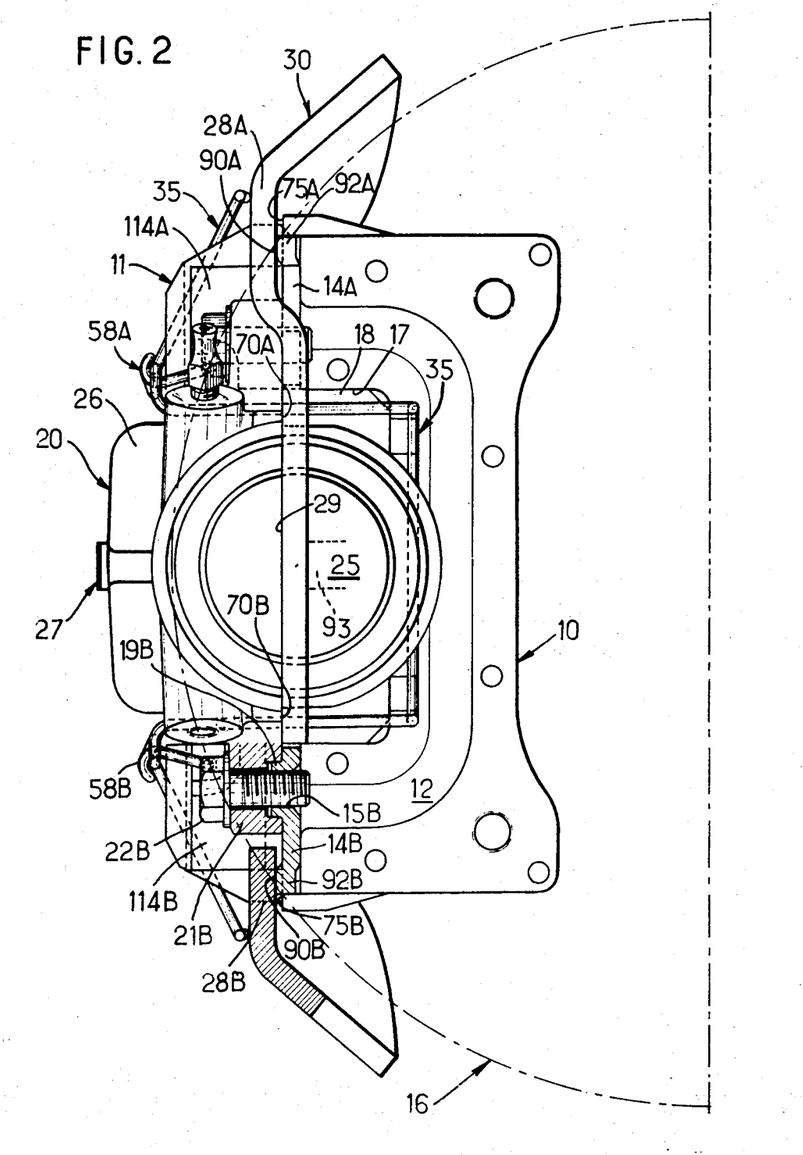
FIG. 2 is a side view of this brake in the direction of the arrow II of FIG. 1, with a local cross-section taken along the lines IIA—IIA of FIG. 1.
Figures 3, 4, 5, 6:
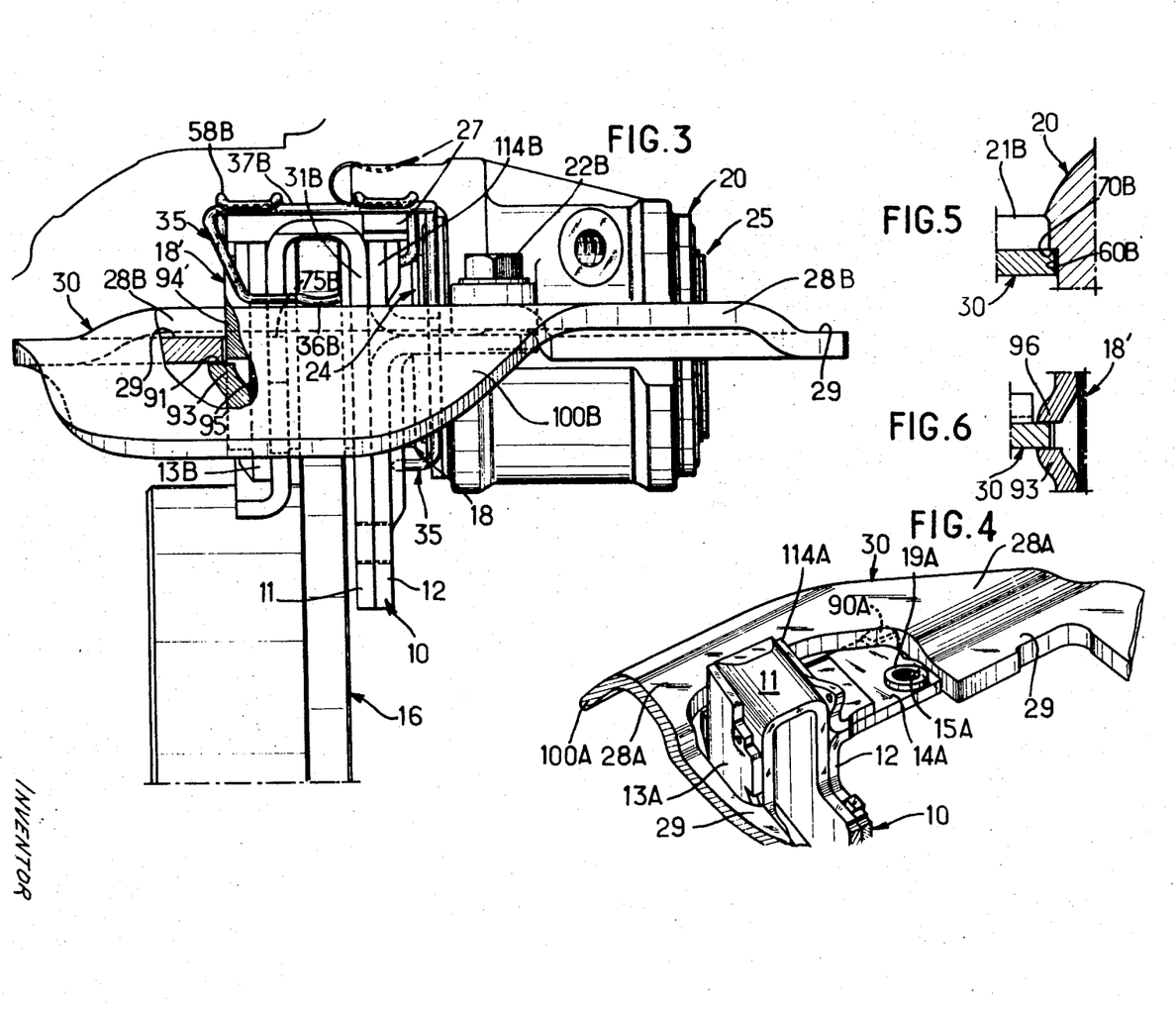
FIG. 3 is a view in elevation of this brake, in the direction of the arrow III of FIG. 1, with a local section taken along the lines IIIA—IIIA of FIG. 1.
FIG. 4 is a partial view in perspective of the fixed supports and transfer member only of this brake.
FIG. 5 is a partial view in cross-section, taken along the line V—V of FIG. 1.
FIG. 6 is a partial view in cross-section of a detail of FIG. 3 and relates to an alternative form of construction.

In accordance with the forms of construction shown in FIGS. 1 to 3, the invention is applied to a brake of the kind comprising a fixed support 10 formed by a U-shaped member 11 provided on one of its faces with a bracket 12 and on the other with two reinforcing members 13A, 13B. The bracket 12 is fixed by its main face against the member 11 and is provided with wings 14A, 14B, substantially coplanar perpendicularly to the faces of the member 11. With the wings 14A, 14B are associated reinforcing squares 114A, 114B, fixed by one face on the corresponding wing 14A, 15B, and by the other face on the member 11.

The support 10 is engaged by its member 11 on a disc 16 fixed to the wheel to be braked and is provided, on each side of this disc, with two housings 17, 17' intended to receive brake-shoes 18, 18' respectively.

An actuating unit 20 which laterally carries two lugs 21A, 21B, is fixed by screws 22A, 22B, respectively on the wings 14A, 14B of the bracket 12, which are provided for that purpose with threaded passages formed by means of punching. In FIG. 2, only the threaded pasage 15B is visible together with the punched out portion 19B corresponding to the wing 14B of the bracket 12, while FIG. 4 shows the threaded passage 15A and the punched portion 19A corresponding to the ring 14A of this bracket.

The actuating unit 20 is pierced with a bore in which two pistons 24, 25 are slidably mounted to move in opposite directions under the control of a hydraulic circuit (not shown).

At its upper portion, the actuating unit 20 comprises externally an overhung plate 26 which is directly above the single shoe 18 and ensures the radial retention of this latter by means of a spring blade 27 intended to absorb any possible vibration of the shoe.

With the actuating unit 20 is associated an annular transfer member 30 which extends perpendicularly to the disc 16, round the unit 20, the support 10 and the brake-shoes 18, 18'.

This transfer member or ring 30 has two parallel corrugations 28A, 28B, the generator lines of which are perpendicular to the plane of the disc. These corrugations project from the upper surface of the ring 30 and form between them a central hollow zone 29. On the side of the actuating unit 20, these corrugations reach the outer periphery of the ring 30; on the side of the shoe 18' they are limited by downwardly projecting enclosing portions provided laterally on the ring 30.

According to the invention, the ring 30 only bears on three supporting areas 90A, 90B, and 91, and these supporting areas are flat.

According to the form of embodiment shown in FIGS. 1 to 3, these supporting surfaces are furthermore parallel and the ring 30 rests on them.

The first two of these supporting areas, the areas 90A, 90B, are coplanar. They are formed by the upper punched-out surface in relief 92A, 92B, formed on the outer side edges of the wings 14A, 14B of the bracket 12. The ring 30 co-operates with these areas 90A, 90B, by the hollow portions of its corrugations 28A, 28B.

The supporting surface 91 is formed by the upper edge of a small tongue 93 forming a projection in the central zone of the brake-shoe 18'. According to the form of construction shown, the shoe 18' being formed in known manner by a metal supporting plate 94' on which is fixed a friction lining 95', the tongue 93 is formed by a suitably cut-out and bent portion of this plate 94'. The ring 40 co-operates with this tongue 93 by the lower face of its central zone 29.

The ring 30 is free to move perpendicularly to the disc 16, within the limits of a support of its inside periphery against the shoe 18' or against the piston 25, FIGS. 1 and 3. In such a movement, it is laterally guided by the actuating unit 20 which is provided for that purpose with bearing surfaces 60A, 60B, and also by shoulders 31A, 31B, of the member 11.

The ring 30 is further subjected to elastic means which hold it elastically in application against the supporting faces 90A, 90B, 91 described above.

According to the form of construction shown in FIGS. 1 to 3, these elastic means comprise a single spring 35, formed by means of a round metal wire bent to an appropriate shape. This spring 35 is supported by arms 36A, 36B against the ring 30, and is fixed to the support 10 by hooks 58A, 58B passed over arms 37A, 37B of the spring 35 and articulated on the support 10.

It is important to note that it is this spring 35 which acts through the intermediary of the ring 30 to ensure the radial retention in one direction of the shoe 18' in its housing 17', towards the exterior in the example shown. It is therefore not necessary to provide any particular elastic means for this shoe.

In case of absence or fracture of the spring 35, the maintenance of the ring 30 perpendicular to its plane remains ensured, on one of its faces by the supporting areas 90A, 90B and 91, and on the other of its faces by bearing surfaces 70A, 70B provided on the actuating unit 20 perpendicular to its surfaces 60A and 60B.

In addition, the support 10 is provided laterally on that of the faces of its U-member 11 which is on the same side of the shoe 18' with respect to the disc, with bearing surfaces 75A, 75B intended to hold the ring 30 in the case of absence of the shoe 18', during the replacement of this latter, for example.

The operation of the brake described above is as follows: when a braking pressure is sent into the circuit to which the actuating unit 20 is connected, this pressure is applied directly to the shoe 18 by the piston 24, while the force developed by the piston 25 on the ring 30 causes the latter to move perpendicularly to the disc 16, and in consequence the transmission of this force to the brake-shoe 18'. The disc 16 is thus gripped locally between the brake-shoes 18, 18'.

When the braking pressure is removed, the disc 16 is released.

With regard to the dismantling of the brake for the purpose of replacing its shoes, this is effected as follows: removal of the screws 22A, 22B, and removal of the actuating unit 20, without it being necessary to disconnect the hydraulic circuit coupled to this letter. These two operations give access to the shoe 18. If necessary, the dismantling is continued by causing the ring 30 to slide in the direction II of FIG. 1 until this ring escapes from the edge 91 of the tongue 93 of the shoe 18'. This operation then gives access to the shoe 18'.

According to the alternative form of construction shown in FIG. 6, the brake-shoe 18' carries in projection at least two tongues 93, 96 arranged on each side of the ring 30.

In FIGS. 7 to 10, there will be recognized a disc-brake of the kind comprising, as above, a fixed support 110 adapted to receive brake-shoes 18, 18' on each side of a disc 16 rigidly fixed to the wheel to be braked, an actuating unit 20 provided laterally with two lugs 21A, 21B for its fixing by screws 22A, 22B on the support 110, and which is pierced by a bore in which two pistons 24, 25 are mounted slidably in opposite directions, and an annular transfer member or ring 30 which extends perpendicularly to the plane of the disc 16, around the actuating unit 20, the support 110 and the brake-shoes 18, 18', and which has two corrugations 28A, 28B, the generator lines of which are perpendicular to the plane of the disc. The piston 24 bears against the brake-shoe 18 while the piston 25 is in contact with the ring 30.

The support 110, the contours of which have been deliberately drawn in heavier lines on the drawings, is a single piece produced by casting, of cast-iron, steel or aluminium for example.

This support 110 has the general shape of a U-member (FIG. 9), the faces 111, 111' of which on each side the disc 16, are both provided with stiffening ribs 113, 113' respectively, FIGS. 3 and 5, and are each pierced by a window 117, 117' respectively, FIG. 4, for housing the shoes 18, 18' respectively. Some of the stiffening ribs 113, 113' are extended up to the housings 117, 117' of the shoes and thus form abutments against which are supported the corresponding shoes 18, 18'.

Level with the periphery of the disc 16, the support 110 is provided with a continuous bracing wall 123 which carries lugs 126, 126' on each side of its central portion, directly above the windows 117, 117' respectively. According to the form of construction shown in the drawings, these lugs 126, 126' are integral with the support 110 by forming on the support during casting.

Figure 8:
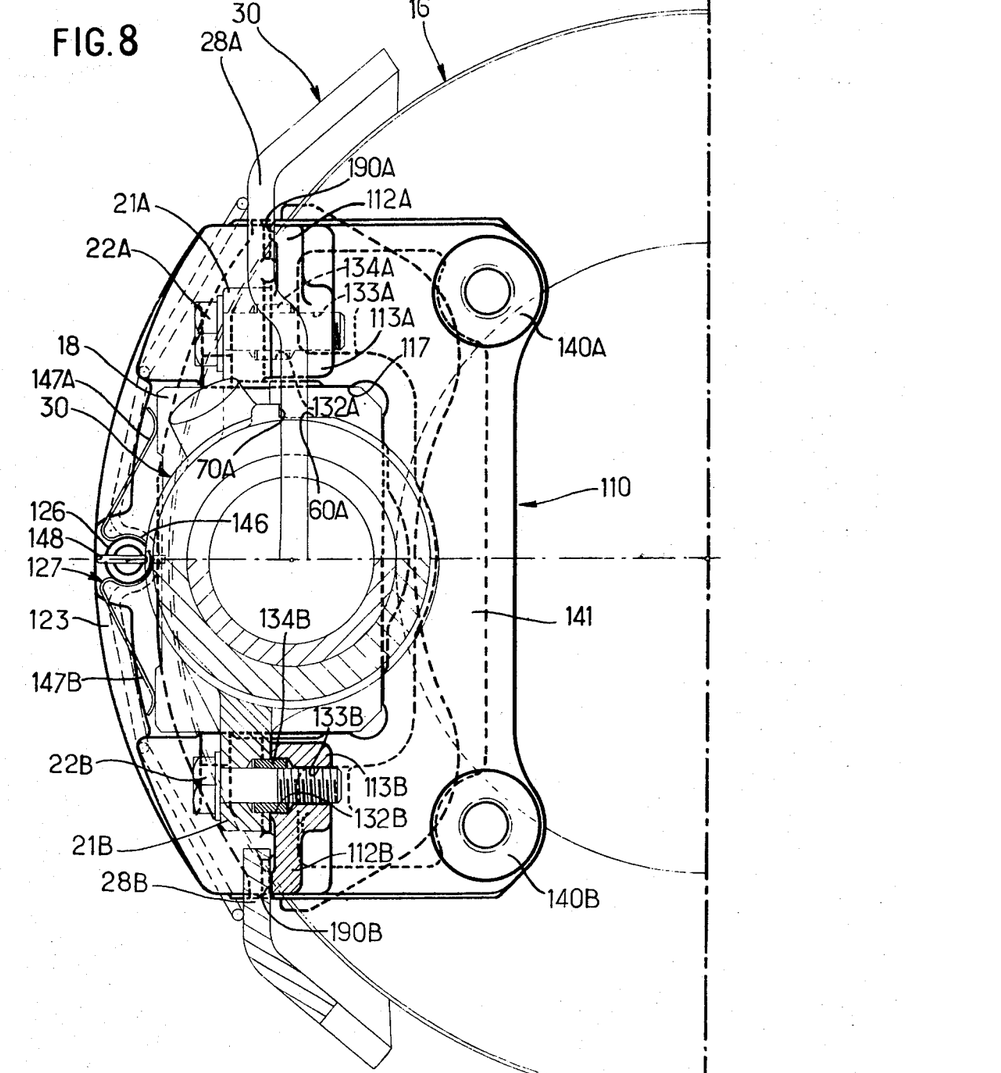
FIGS. 8 and 9 are views in cross-section of this alternative form, taken respectively along the lines VIII—VIII and IX—IX of FIG. 7.
Figure 9:
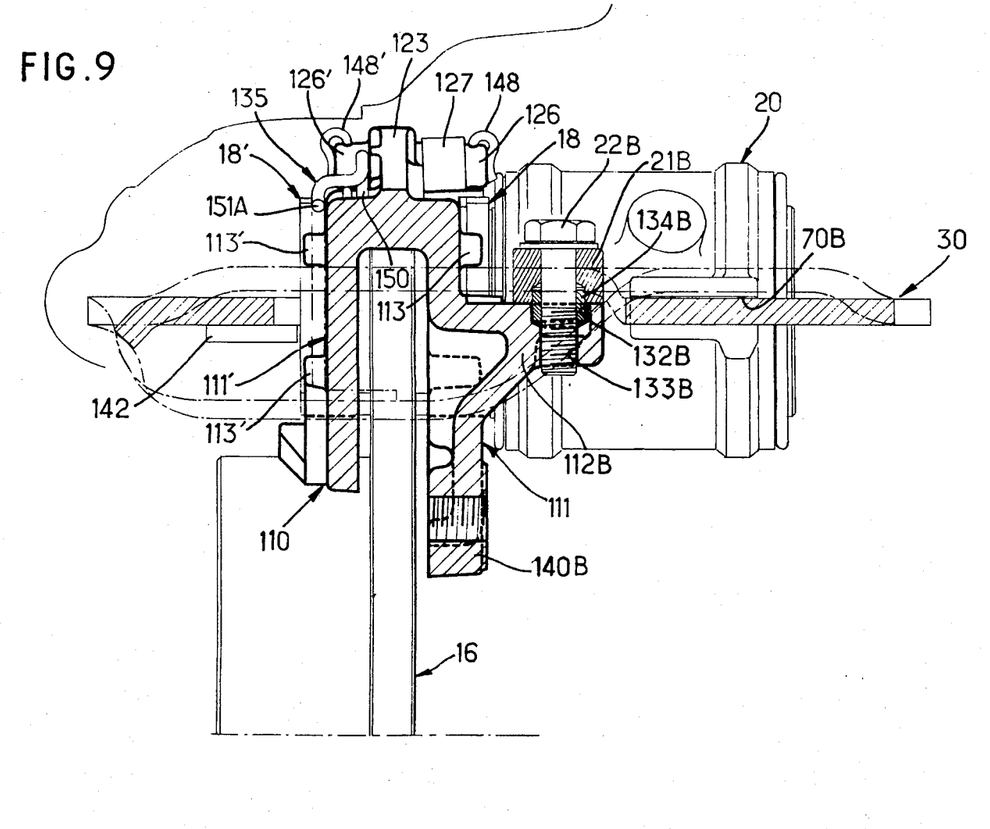

The face 111 of the support 110, that is to say that which is located on the same side of the disc 16 as the actuating unit 20, is provided, on each side of its window 117, with two projecting portions 112A, 112B, FIGS. 8 and 9, which are substantially perpendicular to the plane of the disc 16. Each of these projections 112A, 112B is formed, in the vicinity of the window 117, with an additional thickness 113A, 113B, respectively, in which are bored successively a pilot hole 132A, 132B, and a threaded hole 133A, 133B, respectively. The holes 133A, 133B receive the fixing screws 22A, 22B for the actuating unit 20, while the pilot-holes 132A, 132B receive centering sleeves 134A, 134B, arranged respectively around the said screws and partly engaged in the said pilot holes and partly in the lugs 21A, 21B respectively of the said actuating unit 20.

The projections 112A, 112B are further provided along their edges farthest away from the actuating unit 20, with additional raised portions 190A, 190B, serving as supporting surfaces for the transfer ring 30.

The face 111 of the support 110 finally comprises two lugs 140A, 140B, intended for the fixing of the said support and joined together at 141 by a coupling and stiffening zone, FIG. 8, directly above the window 117.

Figure 10:
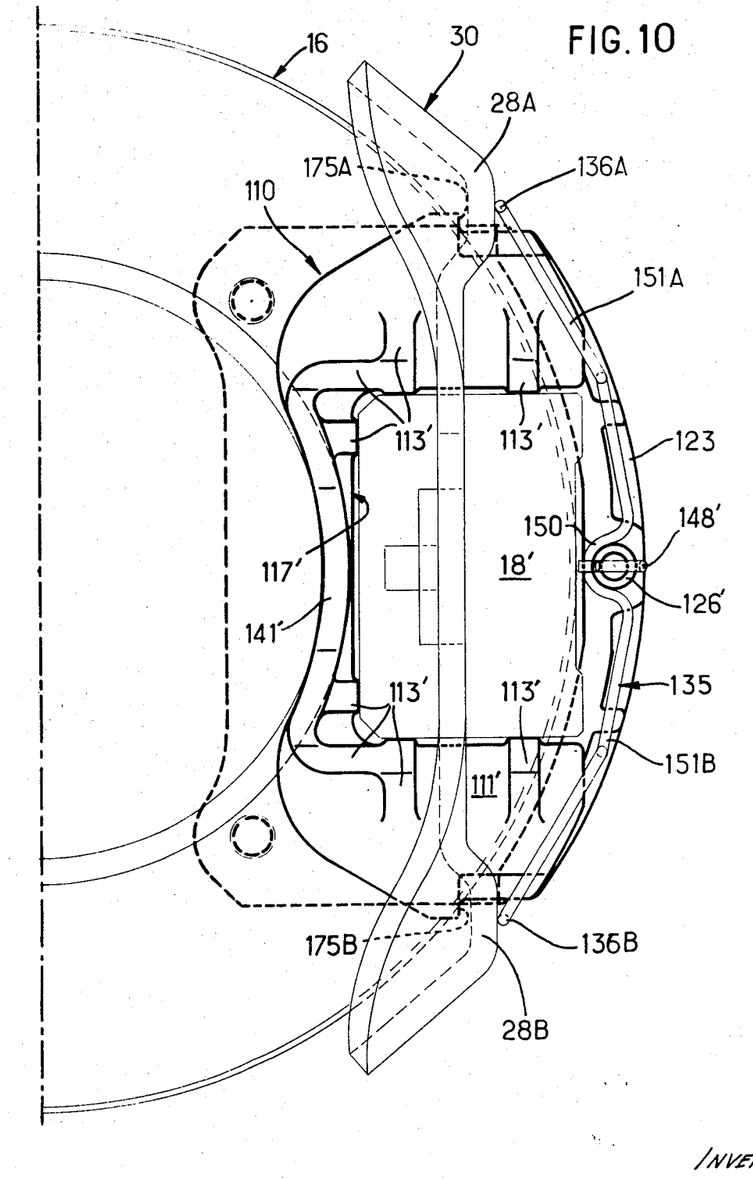
FIG. 10 is a side view of this alternative form, in the direction of the arrow X of FIG. 7.

Similarly, the face 111' of the support 110 comprises, FIG. 10, a coupling and stiffening zone 141' directly above its window 117'.

Figure 7:
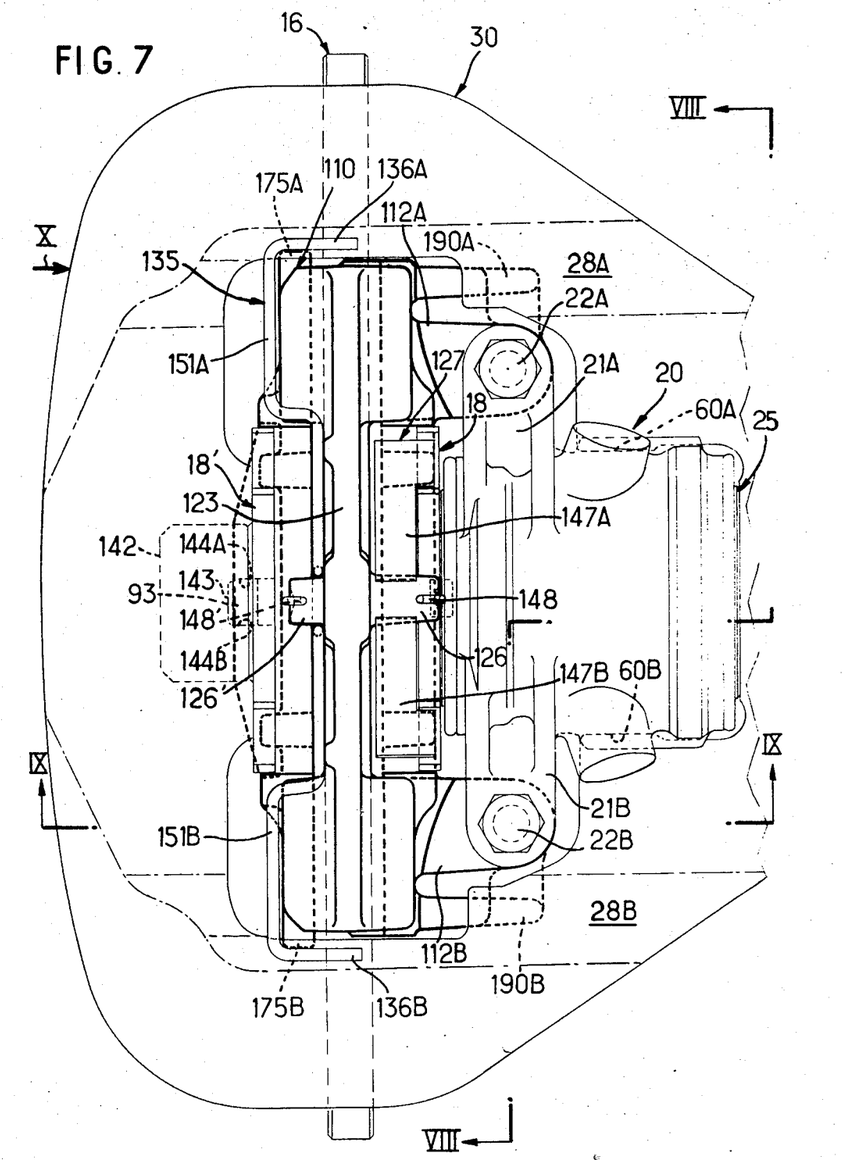
FIG. 7 is a view similar to FIG. 1, and relates to an alternative form of construction.

As described above, the transfer ring 30 only bears against three supporting areas which, in addition to the bearing surfaces 190A, 190B referred to above, comprises, FIG. 7, on the other side of the disc 16 with respect to the said surfaces, the upper edge 91 of a tongue 93 formed by a suitably cut-out and bent portion of the metal supporting plate 94' associated with the brake-shoe 18'.

According to the form of construction shown in FIGS. 7 to 10, the transfer ring 30 is provided facing the said tongue 93 with a reinforcing plate 142 engaged by a notch 143 on the said tongue, the lateral flanks 144A, 144B of this notch forming bearing surfaces intended to co-operate with the corresponding flanks of the tongue 93, in order to guide the transfer ring 30 perpendicularly to the plane of the disc.

In addition, the face 111' of the support 110 is provided on each side of its window 117', FIGS. 7 and 10, with stop faces 175A, 175B which are intended as described above to retain the ring 30 in the event of absence of the shoe 18', during the changing of this latter for example.

The stud 126 carries a spring 127 interposed between the fixed support 110 and the brake-shoe 18, FIG. 8. This spring 127, formed by a suitably bent elastic blade, comprises a central portion 146 in the form of an omega which is elastically engaged on the stud 126, on the side of this latter facing the shoe 18, and two lateral arms 147A, 147B which are suitably bent back at their extremities so as to bear against the said shoe 18. A pin 148 engaged in the stud 126 prevents the spring from escaping from this latter.

The stud 126' carries a spring 135, interposed between the fixed support 110 and the transfer ring 30, and formed by means of a round metal wire bent to the appropriate shape. This spring 135, FIGS. 7 and 10, comprises an omega-shaped central portion 150 which is engaged on the stud 126' on the side facing the brakeshoe 18', and two lateral arms 151A, 151B, which are shaped so as to pass round the support 110 and which terminate in extremities 136A, 136B respectively supported against the transfer ring 30. A pin 148' engaged in the stud 126' prevents the spring 135 from escaping from this latter.

As previously described, the ring 30 is free to move perpendicularly with respect to the disc 16 within the limits of a support of its internal periphery against the shoe 18' or against the piston 25, FIG. 7. In such a movement it is guided laterally by the actuating unit 20 which is provided for that purpose with the bearing surfaces 60A, 60B, and by the flanks of the tongue 93 of the shoe 18'. In case of the absence or fracture of the spring 135, the retention of the ring 30 perpendicular to its plane remains ensured, on one of its faces by the supporting areas 190A, 190B and 91, and on the other face by bearing surfaces 70A, 70B, provided on the actuating unit 20 perpendicular to the surfaces 60A, 60B, these bearing surfaces 70A, 70B forming with the supporting areas 190A, 190B and 91 guiding grooves for the ring 30 perpendicularly to the plane of the disc 16.

According to an alternating form of construction (not shown), the studs 126, 126' are replaced by a pin having a fluted central portion forcibly engaged in a passage of the bracing wall 123 of the support 110, and on each side of this latter, two extremities, one for supporting the spring 127 and the other as a support for the spring 135.

As will have been understood, the studs 126, 126', or the corresponding extremities of the pin in question, or any other appropriate radial abutment means, prevent the shoes 18, 18' from passing radially out of their housings 117, 117'; the safety of the device is thereby improved.

In the preceding arangement, the fixed support has the shape of a U and the transfer ring is applied against the associated supporting areas in a centripetal manner with respect to the disc, that is to say in a radial direction from the periphery of the disc to its axis.

There will now be described, with reference to FIGS. 11 to 16, an alternative form in which the fixed support has the form of a bracket and the transfer ring is applied against the associated supporting areas in a centrifugal manner with respect to the disc, that is to say in a radial direction from the axis of the disc to its periphery.

Figure 11:
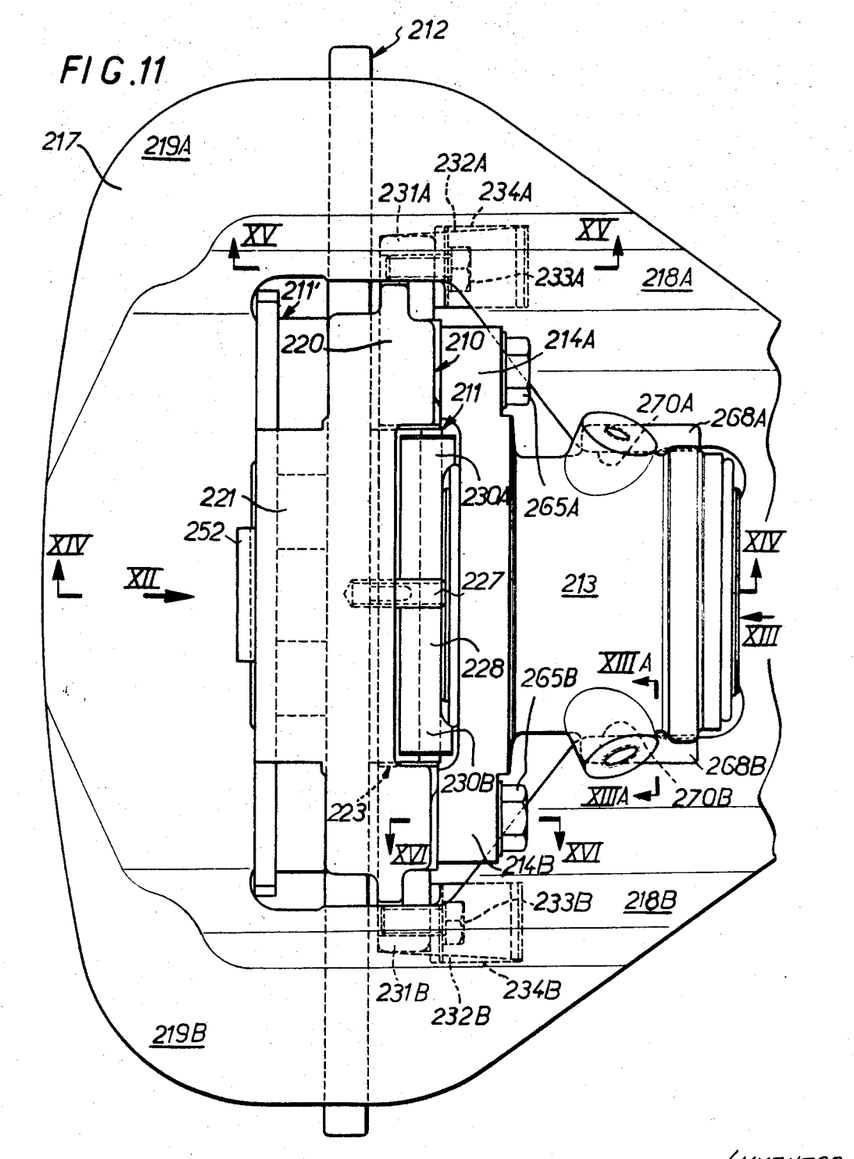
FIG. 11 is a view similar to FIG. 1, and relates to a further alternative form of construction.

The disc brake shown in these FIGS. 11 to 16 comprises: a fixed support 210, two brake-shoes 211, 211' on each side of a disc 212 rigidly fixed to the wheel to be braked; an actuating unit 213 provided laterally with two lugs 214A, 214B for its removable fixing on the support 210, as described later, and which is pierced (FIG. 14) with a bore in which two pistons 215, 216, are slidably mounted in opposite directions; and an annular transfer member or ring 217 which extends perpendicularly to the plane of the disc 212, round the actuating unit 213, the support 210 and the brake-shoes 211, 211', and which is formed with two corrugations 218A, 218B having their generator lines perpendicular to the plane of the disc, and which is provided at its periphery with bent-back portions 219A, 219B enclosing the disc laterally. The piston 215 bears on the brake-shoe 211 while the piston 216 bears on the ring 217 which is in turn intended to bear against the brake-shoe 211' (FIGS. 11 and 14).

The fixed support 210, preferably cast, has the form of a bracket comprising an end piece 220 parallel to the plane of the disc 212 and a return 221 perpendicular to the end-piece 200 facing the periphery of the said disc.

The end-piece 220 which is arranged on the same side of the disc as the actuating unit 213, is provided at its lower portion with two fixing lugs 222A, 222B.

This end-piece 220 is pierced opposite the actuating unit 213 with a window 323 serving as a housing for the brake-shoe 211. The periphery of this window is edged in places by reinforcing ribs 224 (FIG. 13) which project into the window 223 to form bearing surfaces 225 against which the brake-shoe 211 is supported.

The window 223 of the end-plate 220 is also associated with the return 221 coupled to this end-plate. Immediately above the brake-shoe 211, this return carries a pin 227, elastic means being interposed between this pin 227 and the brake-shoe 211 (FIGS. 11 and 13). According to the form of construction shown, these elastic means comprise an elastic blade 228 having a central portion 229 of semi-cylindrical shape, supported against the pin 227 and two lateral arms 230A, 230B, the curved-back extremities of which are supported against the corresponding edge of the brake-shoe 211.

Figure 12:
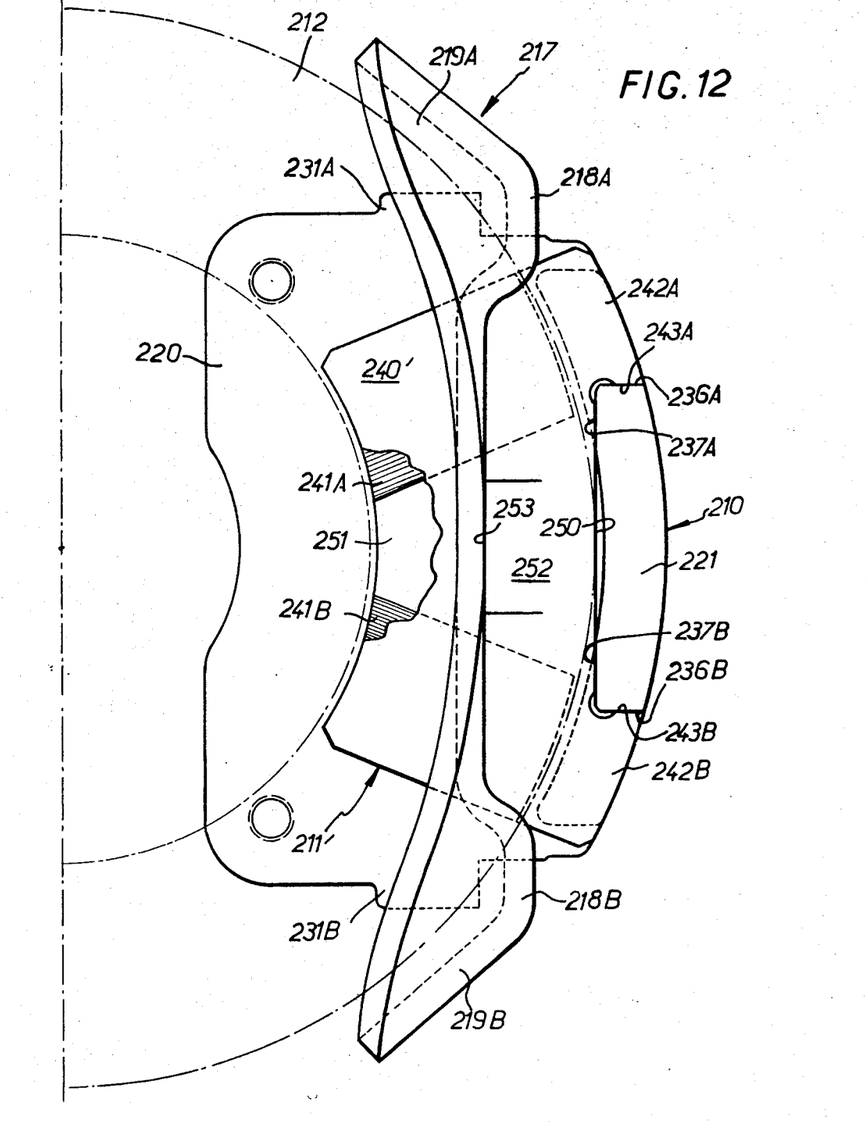
FIG. 12 is a side view of this alternative form in the direction of the arrow XII of FIG. 11 with parts broken away locally.
Figure 13:
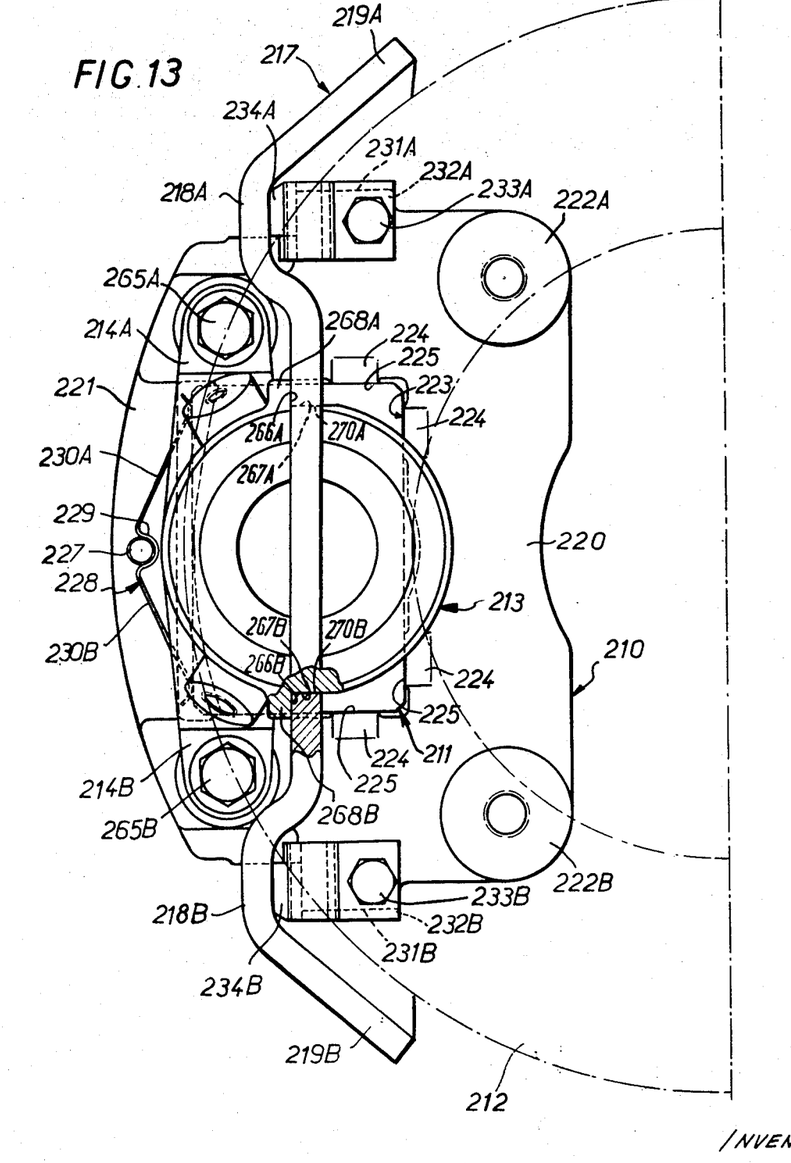
FIG. 13 is a side view in the direction of the arrow XIII of FIG. 11, with a local cross-section taken along the line XIII-A—XIII-A of FIG. 11.
Figures 14, 15, 16:
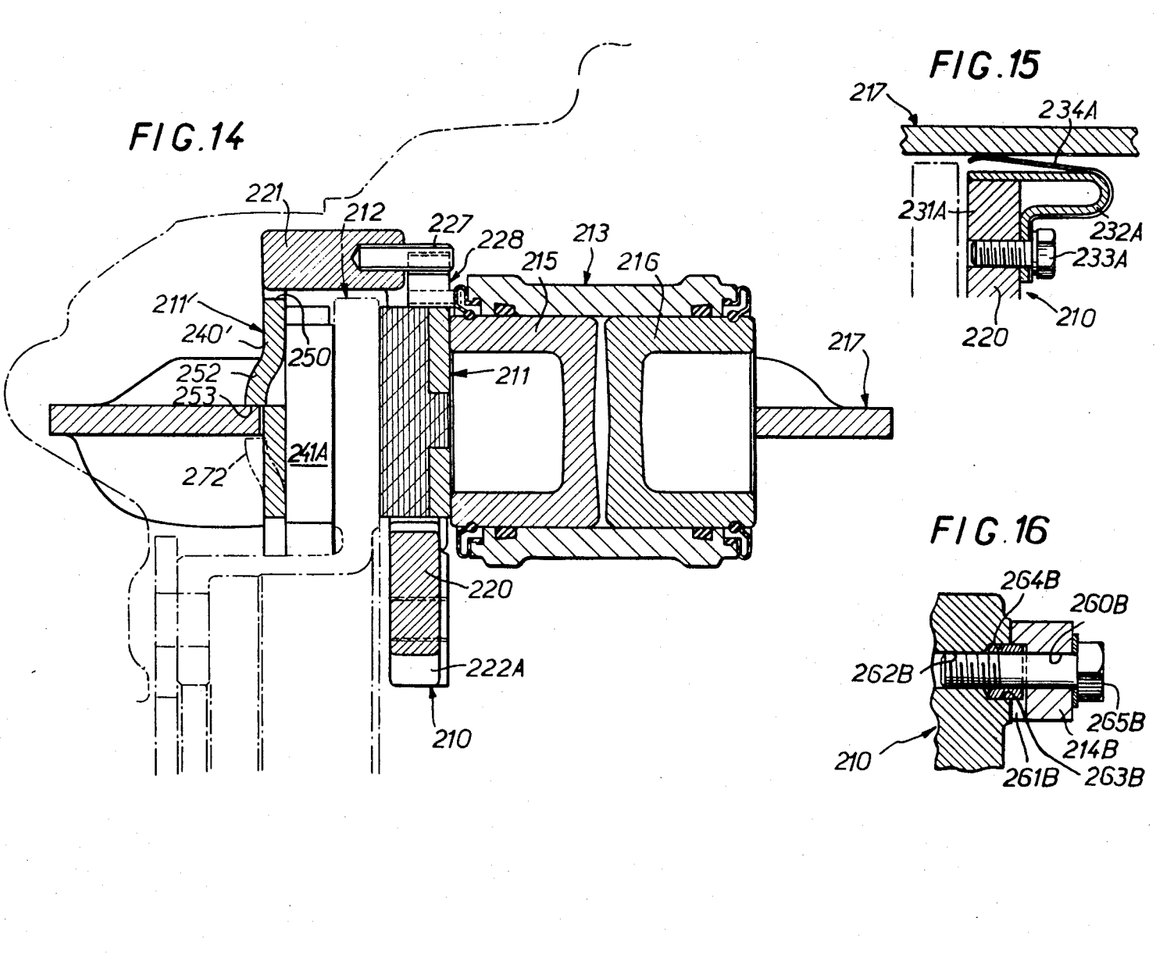
FIGS. 14, 15 and 16 are views in cross-section, some being partial, taken respectively along the lines XIV—XIV, XV—XV and XVI—XVI of FIG. 11.

Laterally, on each side of the window 223, the end-plate 220 of the fixed support 210 is provided with two projecting portions 231A, 231B respectively (FIGS. 12, 13 and 15).

On these projections 231A, 231B, are respectively fixed brackets 232A, 232B which are fixed by screws 233A, 233B and which serve for the articulation of spring blades 234A, 234B which apply a thrust on the ring 217. As will be noted, this thrust applied by the springs on the ring 217 tends to move this ring away from the disc 212, that is to say it is directed substantially in a direction from the interior of the disc 212 to the periphery of the said disc.

According to the form of construction shown in FIGS. 11 to 14, and more particularly in FIG. 12, the return 221 of the fixed support 210 is provided laterally with two transverse supporting abutments 236A, 236B at its two extremities and two longitudinal supporting abutments 237A, 237B on that of its faces which is opposite the ring 217 (FIG. 12).

At the same time, the metal plate 240' which carries the friction lining of the brake-shoe 211', which will be explained later, comprises laterally two extensions 242A, 242B which enclose the return 221 of the fixed support 210. These extensions 242A, 242B form supporting surfaces 243A, 243B respectively facing each other, which co-operate with the transverse supporting abutments 236A, 236B of the return 221 of the support 210. In addition, between these extensions 242A, 242B, the metal plate 240' of the brake-shoe 211' forms a supporting surface 250 which co-operates with the longitudinal supporting abutments 237A, 237B of the said return 221.

This arrangement gives a substantial development to the brake-shoe 211, which is thus no longer confined in a window of any kind.

Means are provided, as shown, for taking advantage of this development to split-up the friction lining of this shoe 211' into two parts 241A, 241B arranged on each side of a free ventilation space 251.

In the plate 240' of the brake-shoe 211' a tongue 252 is cut-out, and this tongue is bent, as shown in FIG. 14, in such manner that its free edge 253 bears against the transfer ring 217.

By reason of the elastic force applied on this ring 217 by the springs 234A, 234B, the brake-shoe 211' is held elastically applied by its supporting surface 250 against the longitudinal supporting abutments 237A, 237B of the return 221 of the fixed support 210. This shoe is thus retained radially between two supporting surfaces facing each other, one formed on the return 211 of the fixed support 210, the other formed on the transfer ring 217.

As has already been seen above, the actuating unit 213 is provided with two lateral lugs 214A, 214B for its fixing on the end-plate 220 of the support 210. These lugs are parallel to the end-plate 220 of the support 210. As can be seen from FIG. 16 with reference to the single lug 214B, the drilled hole 260B formed in this lug is extended laterally by a hollowed out portion 261B on that face of the said lug which is intended to come into contact with the end-plate 220 of the support 210. At the same time, this latter is provided with a threaded bore 262B opening to the exterior by a pilot hole 263B, in which is partially engaged a centering sleeve 264B.

A similar arrangement is adopted for the lug 214A of the actuating unit 213 (not detailed in the drawings).

As will be readily understood, the hollowed out portions of these lugs such as the open portion 261B described above, permits the direct engagement of the actuating unit 213, parallel to the plane of the disc 212, on the centering sleeves such as the sleeve 264B described above, carried by the end plate 220 of the support 210. This arrangement facilitates the placing in position of the screws 265A, 265B which are intended to provide the fixing of the actuating unit 213 on the support 210.

At its rear portion and on each side of the actuating unit 213 there are provided right-angle bearing surfaces 266A, 266B and 267A, 267B respectively, which are each perpendicular to the plane of the disc 212, the surfaces 266A, 266B forming the lower face of longitudinal beads 268A, 268B provided laterally on the actuating unit 213.

As has already been seen, the transfer ring 217 rests on the springs 234A, 234B carried by the fixed support 210, and it is engaged under the tongue 252 of the brake-shoe 211'. As shown in FIGS. 11 and 13, it is furthermore engaged under the longitudinal beads 268A, 268B of the actuating unit 213, so that the bearing surfaces 266A, 266B of these beads ensure its radial retention, while at the same time the bearing surfaces 267A, 267B of these beads ensure its correct guiding perpendicularly to the plane of the disc. For this guiding, the ring 217 is provided with straight edges 270A, 270B in contact with the surfaces 267A, 267B of the actuating unit 213.

Thus, the transfer ring 217 is retained on one of its faces by the springs 234A, 234B and on its other face by the bearing surfaces 266A, 266B of the actuating unit 213, and by the tongue 252 of the brake-shoe 211'; and it transmits to the shoe 211' the elastic force which is applied to it by the springs 234A, 234B for contact of the said shoe with the return 221 of the fixed support 210.

The operation of the brake described above, its dismantling and re-assembly are carried out as previously.

During the assembly, in order to facilitate the placing in position of the shoe 211', according to an alternative form of construction indicated by a broken line in FIG. 14, provision is made to associate with the tongue 252 of this shoe, a similar tongue 272 arranged so as to form with the preceding tongue a slot by which the said shoe can be engaged on the ring 217.

It will of course be understood that the present invention is not limited to the form of construction described and shown, but includes any alternative form of construction and/or of combination of their various elements, especially as regards the elastic supporting means of the transfer ring.

In addition, the supporting areas of the transfer member are not necessarily parallel to each other; according to an alternative form of construction (not shown) these supporting areas which are located on the side of the actuation unit form a dihedral having its crest parallel to the axis of the disc.

Finally, the field of application of the invention is not restricted to the application more particularly described above. It extends to brakes in which the actuating unit is carried by the transfer member and not by the fixed support, and/or in which the transfer member is a U-shaped stirrup engaged on the disc, and/or in which a brake-shoe has its housing formed in the fixed support while the other is carried on the transfer member or the actuating unit, the fixed support thus carrying only one of the brake-shoes.

What I claim is:

1. A disc brake of the type comprising a rotating disc fixed to the member to be braked, a fixed support, two brake shoes mounted one on each side of the disc for movement perpendicular to the plane of the disc, an actuating unit and a transfer member, said actuating unit acting directly on one of said brake shoes and through the intermediary of said transfer member on the other of said brake shoes, said transfer member bearing on only three parallel flat support areas disposed in staggered relationship on opposite sides of said disc, the middle of said three support areas being formed on the brake shoe which is located on the side of the disc opposite said actuating unit, and resilient means acting between said fixed support and said transfer member to urge said transfer member against said three support areas.

2. A disc brake as claimed in claim 1, said middle support area comprising the edge of a tongue projecting from the associated brake shoe.

3. A disc brake as claimed in claim 1, in which the two support areas fixed to said fixed support are arranged on the same side of the disc as the actuating unit and on each side of said unit.

4. A disc brake as claimed in claim 1, in which said resilient means act radially relative to the disc from the periphery of said disc to its axis.

5. A disc brake as claimed in claim 1, in which the two support areas for said transfer member which are formed on said fixed support are coplanar and are raised in height on said support along the lateral edges thereof.

6. A disc brake as claimed in claim 1, in which said fixed support is formed in a single piece.

7. A disc brake as claimed in claim 1, in which said fixed support is provided, on the same side of the disc as the third supporting area of said transfer member on said support and on each side of the axis of said disc, with stop surfaces disposed directly above said transfer member.

8. A disc brake as claimed in claim 1, in which said two areas disposed on said one side of said disc are fixed to said fixed support.

9. A disc brake as claimed in claim 1, in which said middle support area comprises the edge of a tongue projecting from the associated brake-shoe in the central zone of said shoe.

10. A disc brake as claimed in claim 9, in which said associated brake-shoe comprises a metal supporting plate and a friction lining fixed to said plate.

11. A disc brake as claimed in claim 1, in which said fixed support is a U-shaped member having portions extending on each side of said rotating disc and has a continuous bracing wall facing the periphery of said disc.

12. A disc brake as claimed in claim 11, in which said fixed support is provided with two housings on each side of said disc and therefore of said bracing wall, the two brake-shoes being mounted for movement perpendicular to the plane of the disc in said housings, and said bracing wall comprising radial abutment means located directly above said housings on each side.

13. A disc brake as claimed in claim 12, further comprising other resilient means interposed between said fixed support and the brake shoe located on the same side of said disc as the actuating unit, said other resilient means being carried by a stud associated with the bracing wall of said fixed support, and comprising an omega-shaped central portion resiliently engaging said stud and two lateral arms each supported on said shoe on each side of said stud.

14. A disc brake as claimed in claim 13, the first-mentioned resilient means being carried by the other resilient means of the studs of the bracing wall of said fixed support which is on the other side of the disc with respect to said actuating unit, and having an omega-shaped central portion resiliently engaging said stud.

15. A disc brake as claimed in claim 1, in which said fixed support is provided with two housings on each side of said disc, the two brake-shoes being mounted for movement perpendicular to the plane of said disc in said housings, said actuating unit is a hydraulic actuating unit removably mounted on said support, and said transfer member is an annular transfer member surrounding the actuating unit and the brake-shoes.

16. A disc brake as claimed in claim 15, in which said fixed support is a U-shaped member having portions extending on each side of said disc, the one of its faces on the same side of the disc as the actuating unit being provided on each side with a central notch forming a shoe housing, two projecting portions each having a flat bearing surface perpendicular to said disc for fixing said actuating unit.

17. A disc brake as claimed in claim 1, in which said fixed support is a bracket-shaped member comprising an end-plate parallel to the plane of the disc and a return perpendicular to the plane of the disc facing the edge of said disc, said end-plate comprising, facing the actuating unit, a housing for the first brake-shoe, adapted to fix said shoe in both circumferential directions and at least one radial direction, and said return comprising at least one longitudinal supporting abutment for retaining the second brake-shoe radially relative to said disc and at least two transverse supporting abutments for retaining said second brake-shoe to said disc.

18. A disc brake as claimed in claim 17, in which said housing retains said first shoe in both radial directions.

19. A disc brake as claimed in claim 17, in which the transverse supporting abutments of the return of said fixed supports are formed at the ends of said return, the second brake-shoe being provided with two lateral extensions enclosing said return and adapted to co-operate with said abutments.

20. A disc brake as claimed in claim 17, in which said transfer member comprises a supporting surface facing the return of said fixed support and said second brake-shoe is provided between the return of said fixed support and said transfer member with two opposed supporting surfaces for radially retaining the transfer member.

21. A disc brake as claimed in claim 17, in which said two supporting areas which are fixed to said fixed support are formed on said actuating unit.

References Cited

UNITED STATES PATENTS

| | | | |
|---|---|---|---|
| 3,392,809 | 7/1968 | Hodkinson et al. | 188—72.4 |
| 3,543,887 | 12/1970 | Hodkinson | 188—73.4 |
| 3,442,353 | 5/1969 | Harrison | 188—73.4 |
| 3,493,084 | 2/1970 | Maurice | 188—73.4 X |
| 3,245,500 | 4/1966 | Hambling et al. | 188—73.4 X |
| 3,363,727 | 1/1968 | Thirion | 188—73.4 |

FOREIGN PATENTS

| | | | |
|---|---|---|---|
| 1,431,049 | 1/1966 | France | 188—73.4 |

GEORGE E. A. HALVOSA, Primary Examiner

U.S. Cl. X.R.

188—72.5, 73.5